(12) United States Patent
Hama (10) Patent No.: US 9,018,786 B2
(45) Date of Patent: Apr. 28, 2015

(54) WATER CURRENT POWER GENERATING DEVICE

(75) Inventor: Yoshinori Hama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/436,601

(22) Filed: Mar. 30, 2012

(65) Prior Publication Data

US 2012/0248779 A1 Oct. 4, 2012

(30) Foreign Application Priority Data

Mar. 31, 2011 (JP) ................. 2011-079736

(51) Int. Cl.
*F03B 13/00* (2006.01)
*F03B 17/06* (2006.01)

(52) U.S. Cl.
CPC ........... *F03B 17/06* (2013.01); *F05B 2220/709* (2013.01); *F05B 2250/41* (2013.01); *Y02E 10/28* (2013.01)

(58) Field of Classification Search
USPC ............................. 290/54; 310/327, 330, 339
See application file for complete search history.

(56) References Cited

U.S. PATENT DOCUMENTS

| 7,439,657 | B2 * | 10/2008 | Clingman et al. | ............ 310/339 |
| 7,573,173 | B1 * | 8/2009 | Frownfelter | .................. 310/208 |
| 8,499,627 | B2 * | 8/2013 | Hama | ........................ 73/170.29 |
| 2008/0129254 | A1 | 6/2008 | Frayne | |
| 2008/0277941 | A1 * | 11/2008 | Bowles et al. | .................. 290/54 |
| 2011/0252880 | A1 | 10/2011 | Hama | |

FOREIGN PATENT DOCUMENTS

| CA | 2675947 A1 | 2/2011 |
| DE | 102007049418 A1 | 4/2009 |
| JP | 09-182265 A | 7/1997 |
| JP | 2001-157433 A | 6/2001 |
| JP | 2006-226153 A | 8/2006 |
| JP | 2006-226221 A | 8/2006 |
| JP | 2007-9833 A | 1/2007 |
| JP | 2007-198175 A | 8/2007 |

(Continued)

OTHER PUBLICATIONS

M. Yamagishi et al.; "Study on the fluttering characteristics of multi-articulated flat plate in the mean-flow", Proceedings of the $43^{rd}$ and $44^{th}$ JAXA Workshops on "Investigation and Control of Boundary-Layer Transition"; Japan Aerospace Exploration Agency, pp. 41-44, Feb. 2010.

(Continued)

*Primary Examiner* — Vanessa Girardi
(74) *Attorney, Agent, or Firm* — McGinn IP Law Group, PLLC (57) ABSTRACT

A water current power generating device for generating electric power from water current power includes a sway vibrating body which bends in a response to a fluid force exerted on a circumference surface thereof by a water current, sways in a bending state, and generates tension in a response to a deflection angle from a direction of the water current, and at least one tension power generating unit for converting electro-magnetically or piezoelectrically the tension transferred from the sway vibrating body into the electric power such that a stable electric power can be generated from water current power in a variety of water areas of slow-moving water current to fast-moving water current.

5 Claims, 4 Drawing Sheets

(56) References Cited

FOREIGN PATENT DOCUMENTS

| | | |
|---|---|---|
| JP | 2010-512132 A | 4/2010 |
| JP | 2010-136535 A | 6/2010 |
| WO | WO 2008-051322 A2 | 5/2008 |
| WO | WO 2008-066553 A1 | 6/2008 |
| WO | WO 2009/046709 A1 | 4/2009 |
| WO | WO 2009-058759 A2 | 5/2009 |

OTHER PUBLICATIONS

Extended European Search Report dated May 20, 2014.
Japanese Office Action dated Sep. 30, 2014 with partial English Translation.

* cited by examiner

WATER CURRENT POWER GENERATING DEVICE

INCORPORATION BY REFERENCE

This application is based upon and claims the benefit of priority from Japanese Patent Application No. 2011-079736, filed on Mar. 31, 2011, the disclosure of which is incorporated herein in its entirely by reference.

BACKGROUND OF THE INVENTION

1. Field of the Invention

The present invention relates to a water current power generating device capable of generating electric power from water current power, and more particularly to the water current power generating device for generating electric power, by utilizing a vibration phenomenon in which a bowstring member or a bow-shaped member bends in a downstream direction, generates tension and sways in a bending and tensioned state, when put in a water current.

2. Description of the Related Art

As this kind of power generating device, a water current power generating device which converts ocean current energy into mechanical rotational energy is conventionally known, for example as described in patent reference 1 (JP Patent Application Publication No. 2007-009833).

The water current power generating device described in patent reference 1 is made of an axial flow water wheel (rotary wings) to be rotated by ocean current power, and a generating unit to generate electric power electro-magnetically by mechanical rotational energy of the axial flow water wheel.

However, with the water current power generating device (hereinafter, may be referred to as axial flow water wheel power generating device) described in patent reference 1, when a rotary sliding portion is put in sea water, electrolytic corrosion of a metal portion by sea water progresses, and also the sea water leaks from the worn rotary sliding portion, as the rotary sliding portion becomes worn, and as a result, there is a fear that a failure occurs in the axial flow water wheel power generating device. In addition, with such configurations of the axial flow waterwheel power generating device, there is a problem that a reduction of power generating efficiency occurs, since the rotary sliding motion becomes blocked, when marine species, suspended matter, and a like invade the rotary sliding portion.

Therefore, the axial flow water wheel power generating device is lacking in reliability and has a disadvantage that a device maintenance is required, since the axial flow water wheel cannot works continuously and smoothly over a long period of time in the sea and a like. Also, the axial flow water wheel power generating device has a weak point that the axial flow water wheel for an ocean current is expensive.

In addition, the axial flow water wheel power generating device is not suitable for uses in a tidal current or an ocean current shifting direction at frequent intervals, since it is difficult to locate the axial flow water wheel power generating device in the sea so that the axial flow water wheel is always directed against the tidal current or the ocean current.

As water current power generating devices for eliminating the above-mentioned disadvantages of the axial flow water wheel cower generating device, there are provided a water current power generating device utilizing a Karman vortex street, a water current power generating device utilizing a galloping vibration, a water current power generating device utilizing a fluttering vibration, and a like.

The water current power generating device utilizing the Kerman vortex street (hereinafter, may be referred to Karman vortex power generating device) is disclosed in patent reference 2 (JP Patent Application Publication No. 2001-157433) and patent reference 3 (JP Patent Application Publication No. 2010-136535), for example.

The Kalman vortex power generating device described in patent references 2 and 3, includes a column body (including a cylindrical body) and a pair of piezoelectric elements, and when a water current collides with the column body, is configured to convert electromagnetically or piezoelectrically a vibration caused by the Kalman vortex street into an electric output. The Karman vortex street is defined as two staggered rows of swirling vortices generated on both sides of the column body. With such configurations of the Karman vortex power generating device, an intricate mechanisms including an axial flow water wheel and a like becomes unnecessary.

Next, the water current power generating device utilizing the galloping vibration (hereinafter, may be referred to as galloping vibration power generating device) is disclosed in patent reference 4 (JP Patent Application Publication No. 2006-226221), for example.

The galloping vibration power generating device described in patent references 4 is made up of a galloping vibration body having a front plane which receives a fluid flow, and generating a galloping vibration perpendicular to a direction of fluid flow, a flexural vibrating body generating a flexural vibration based on the galloping vibration transmitted from the galloping vibration body, and a piezoelectric transducer converting flexural vibration energy into electrical energy.

Moreover, the water current power generating device utilizing the fluttering vibration (hereinafter, may be referred to as fluttering vibration power generating device) is disclosed, as a wind/water power generating device, in non-patent reference 1 (M. Yamagishi et al.; "Study on the fluttering characteristics of multi-articulated flat plate in the mean-flow", Proceedings of the $43^{rd}$ and $44^{th}$ JAXA Workshops on "Investigation and Control of Boundary-Layer Transition"; Japan Aerospace Exploration Agency, pp. 41-44, February 2010), for example.

The fluttering vibration power generating device described in non-patent reference 1 includes a multi-articulated flat plate for vibrating in a fluttering mode in a mean wind/water flow, and a piezoelectric element for generating electric power from the fluttering vibration generated by the multi-articulated flat plate.

The multi-articulated flat plate is made up of a plurality of flat plates and a plurality of connecting shafts jointing the plurality of flat plates.

However, there are following problems with the Karman vortex power generating device disclosed in patent references 2 and 3. That is, for the Karman vortex power generating device to increase efficiency of power generation by achieving an efficient mechanical vibration, a resonant frequency of a column body must be adjust to match an occurrence frequency of the Karman vortices.

Figure 4:
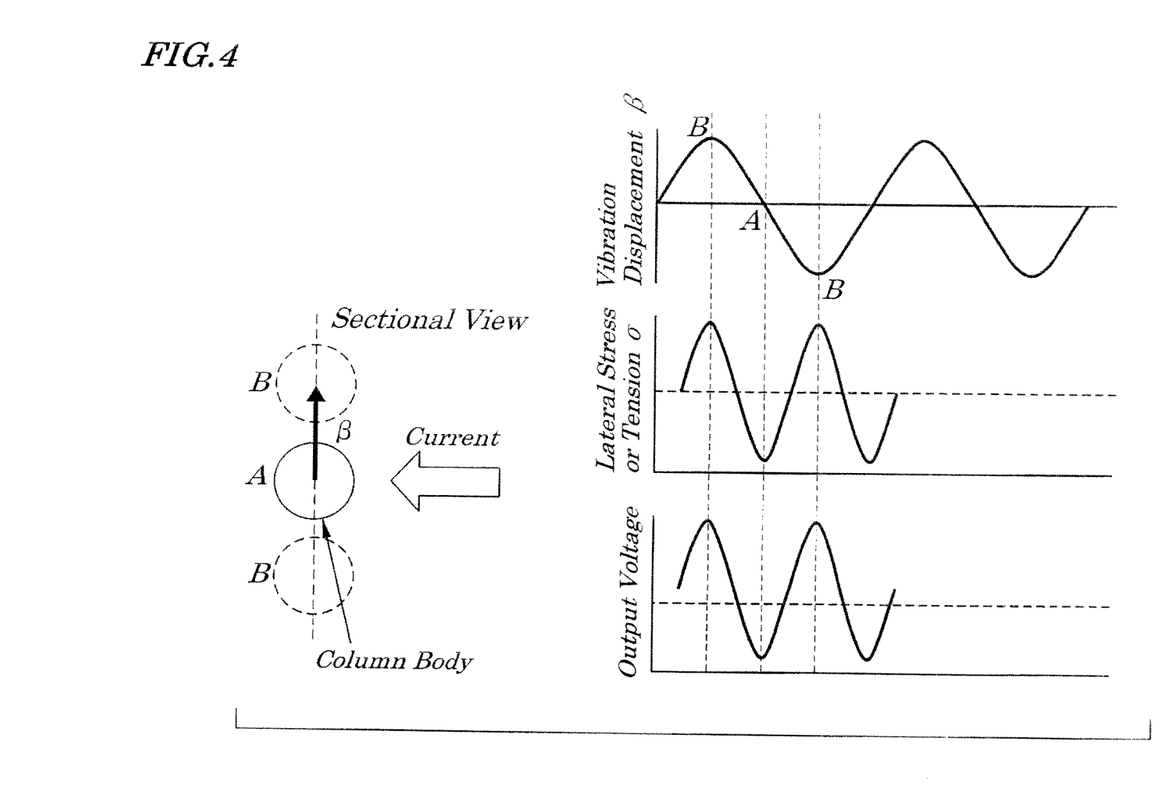
FIG. 4 is an illustration for explaining a related art, including a group of wave form charts showing vibration displacements and tension variations of a column body making up a Karman vortex power generating device, and an output voltage from piezoelectric elements body making up the Karman vortex power generating device.

When both frequencies match, as shown in FIG. 4, a lateral vibration displacement "β" which occurs on the column body by the Kaman vortices reaches its maximum ("B" in FIG. 4). The lateral vibration displacement "β" is defined as a vibration displacement occurring on the column body in a direction orthogonal to a water current. When the lateral vibration displacement "β" reaches its maximum ("B" in FIG. 4), tension σ of the column body reaches its maximum, and an output voltage from the piezoelectric elements also reaches its maximum.

With respect to the Karman vortices, its occurrence frequency is uniquely determined by fluid properties, such as a density and viscosity of fluid, a current velocity, and a diameter of the column body.

On the other hand, With respect to the mechanical vibration of the column body, its resonance frequency is determined by material constants such as a weight of the column body, a diameter and length of the column body, the elastic modulus of a supporting body for supporting the column body, and a like. In addition, the column body is made of a metal and a synthetic resin with high rigidity and the resonance frequency of the column body is high and its sharpness of resonance Q becomes very high, since the column body is placed in a manner of both-ends supporting structure, or cantilever structure.

For the above reasons, it is not easy to design and manufacture the Karman vortex power generating device for uses in a sea area where current velocity varies with a lapse of time, so that the resonant frequency at the column body constantly matches the occurrence frequency of the Karman vortices varying in response to the current velocity.

Consequently, there is a problem that, for the Karman vortex power generating device to increase efficiency of power generation, a column body having a great diameter can be effectively used in fast-moving current area, but not in a slow-moving current area, whereas a column body having a small diameter can be effectively used in a slow-moving current area, but not in a fast-moving current area.

That is, with the Karman vortex power generating device, there is a disadvantage that an appropriate current velocity range is limited.

It is possible to extend the appropriate current velocity range sustaining resonance, utilizing a phenomenon called as a "lock-in". However, an extendable current velocity range is at most two times.

The column body as mentioned above, if made up of a small the column member such as a bowstring, can be configured to achieve a desired resonance frequency by applying a desired tension. However, a tension applying mechanism is required to achieve the desired resonance frequency, and a complex tension controlling mechanism is also required to correct for tension variation, since the resonance frequency of the small diameter of the column body such as a bowstring varies with tension variation due to a fluid force as described later.

Moreover, in real operation, there is a fear that a surface smoothing of the column body is compromised for adhesion of marine life, floating matter and a like, and there is also a problem that a reduction of power generating efficiency occurs for the Kaman vortex power generating device.

Flow separation tram a smooth surface of the column body is an origin of Kaman vortices, and therefore fluid separation becomes responsible for originating a turbulent flow, instead of the Karman vortices, as loss of smoothing on the surface of the column body is advanced.

Furthermore, there is a problem that the Karman vortex power generating device also is not suitable for uses in a tidal current or an ocean current shifting direction at frequent intervals, since power generating efficiency varies and reduces depending upon the direction of water current, as in the case with the axial flow water wheel power generating device.

Because the Karman vortices are not generated, in a stable state, by tidal current flowing an upward or downward slanting direction particularly occurring in a shallow sea area.

Moreover, with the galloping vibration power generating device, there is a problem that a front plane of the galloping vibration body must be placed in a manner to be perpendicular to the direction of fluid flow, in order to generate galloping vibration.

In order to solve the above problem, the galloping vibration power generating device described in patent references 4 further includes a direction determination plate (weathercock plate) capable of moving around in response to variations in direction of fluid flow, so that the front plane of the galloping vibration body constantly faces directly the fluid flow, even if the direction of fluid flow varies. However nevertheless, the galloping vibration power generating device described in patent references 4 has disadvantages of increasing in structural complexity and manufacturing cost.

In addition, with the galloping vibration power generating device described in patent references 4, the flexural vibrating body must convert the galloping vibration generated by the galloping vibration body into the flexural vibration, and transmit the converted flexural vibration to the piezoelectric transducer. For this reason, the flexural vibrating body requires a costly material with great rigidity.

Moreover, with the fluttering vibration power generating device (wind/water power generating device) described in non-patent reference 1, there is a problem that the above-mentioned multi-articulated flat plate for generating fluttering vibration is complicated in mechanical structure, and it is difficult to keep performance withstanding over long periods of time against a variety of external variations, such as variations of current in direction and in flow rate.

Particularly important problem is vulnerability of particular components, such as a wearing down of the mechanical sliding portion of hinge mechanism for enabling the multi-articulated flat plate to flutter.

Moreover, with the fluttering vibration power generating device, there is also a problem that, when a plurality of the fluttering vibration power generating devices is located in close proximity, mutual influence between the fluttering vibration power generating devices cannot be ignored. Because there is a fear that irregular flow occurs in surroundings or lower reaches under the influence of fluttering vibration generated by a upstream multi-articulated flat plate.

SUMMARY OF THE INVENTION

In view of the above, it is a first object of the present invention to provide a water current power generating device capable of generating electric power efficiently from water current power variety of water areas of slow-moving water current to fast-moving water current, despite its compact and lightweight, simple and inexpensive configuration.

Also, it is a second object of the present invention to provide a water current power generating device with high maintainability and durability, which is capable of generating electric power with stability from water current power, without depending upon the direction of water current.

According to an aspect of the present invention, there is provided a water current power generating device for generating electric power from water current power, the device comprising:

a sway vibrating body which bends in response to a fluid force exerted on a circumference surface thereof by a water current, sways in a bending state, and generates tension in response to a deflection angle from a direction of the water current, and at least one tension power generating unit for converting electro-magnetically or piezoelectrically the tension transferred from the sway vibrating body into the electric power.

With the above configurations, while a period of self-sustained sway vibration is determined by a fluid force and structural parameters of the sway vibrating body, such a sway motion can be caused over a wide range of current velocity, and therefore, ever stable electric power can be generated from water current power in a variety of water areas of slow-moving water current to fast-moving water current.

In addition, since the sway vibrating body is made up of a bowstring member or an arched shape of a tension generating member, its compact and lightweight, simple and inexpensive configuration can be achieved.

Also, high maintainability and durability can be achieved, since the bowstring member is not susceptible to adhesion of marine life, and electric power can be efficiently generated from water current power, without depending upon the direction of water current.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EXEMPLARY EMBODIMENTS

Best modes of carrying out the present invention will be described in further detail using various exemplary embodiments with reference to the accompanying drawings.

In order to achieve the present invention, a preferable mode is one that wherein includes a sway vibrating body, made up of a bowstring member or an arched shape of a tension generating member, which bends in response to a fluid force exerted on a circumference surface thereof by a water current, sways in a bending state, and generates tension in response to a deflection angle from a direction of the water current, and a pair of tension power generating units, each made up of a piezoelectric element and a tension transmitting plate, for converting the tension transmitted as compressive stress from the sway vibrating body to the piezoelectric element through the tension transmitting plate into the electric power.

First Exemplary Embodiment

Figure 1:
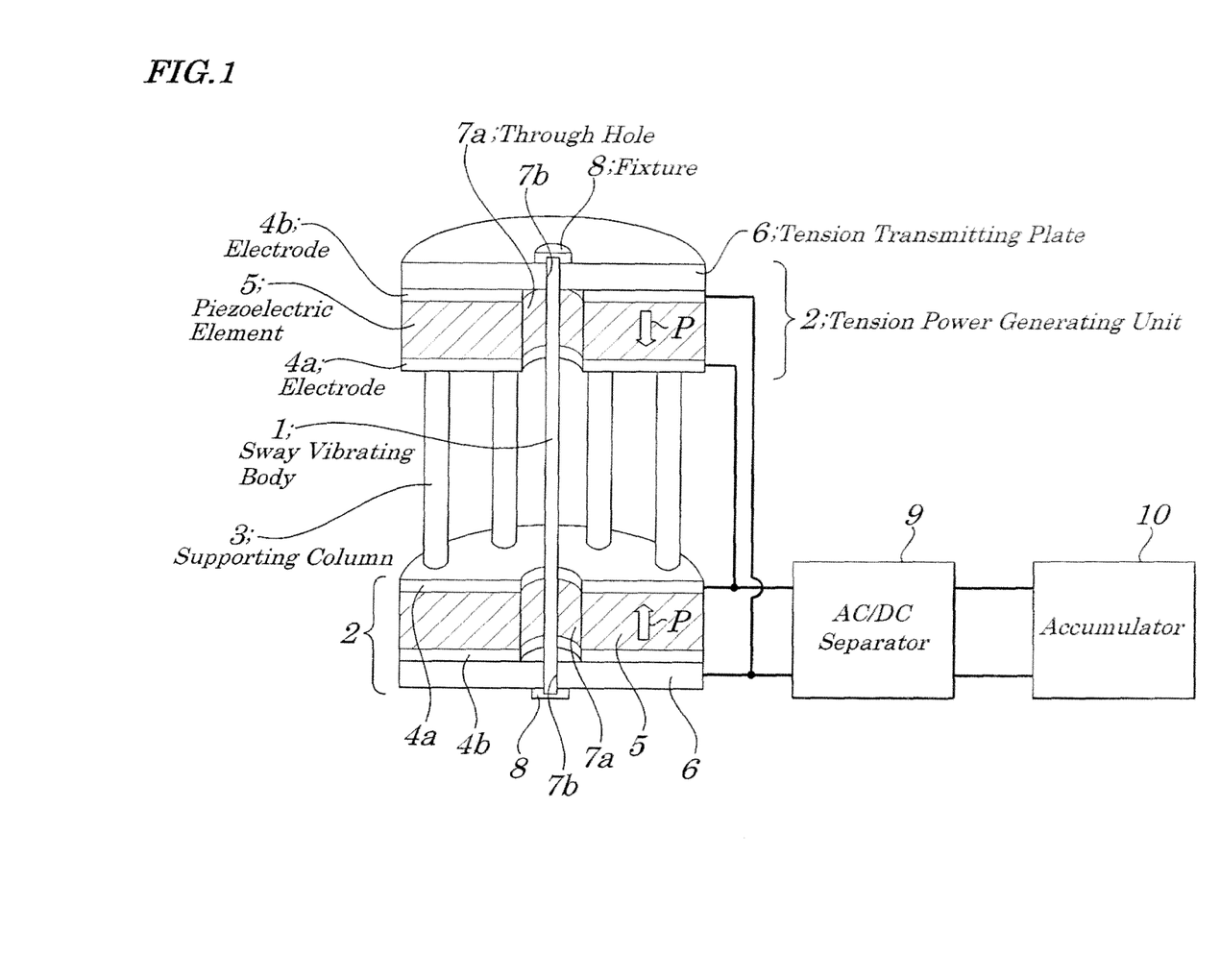
FIG. 1 is a partially perspective and cross-sectional view with a schematic block diagram for schematically showing electrical and mechanical configurations of a water current power generating device according to a first exemplary embodiment of the present invention.

FIG. 1 is a partially perspective and cross-sectional view with a schematic block diagram for schematically showing electrical and mechanical configurations of a water current power generating device according to a first exemplary embodiment of the present invention.

Figure 2:
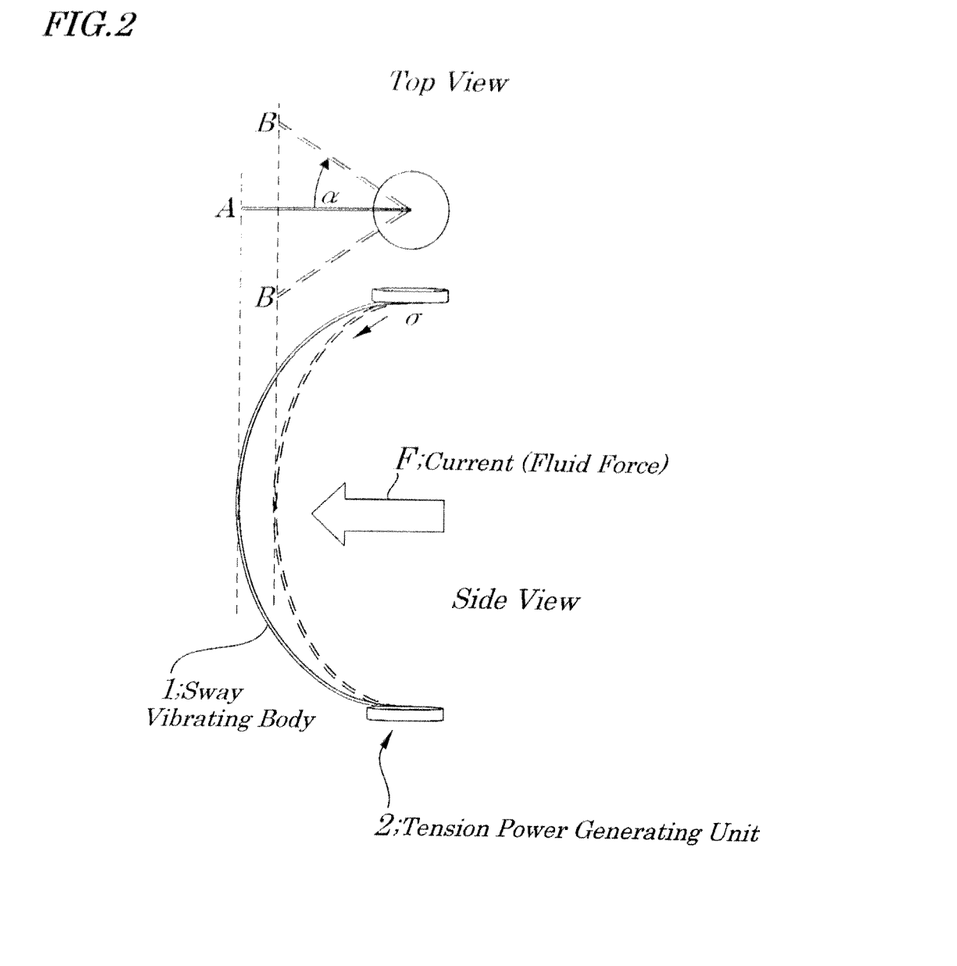
FIG. 2 is a state illustration schematically showing a vibration state in which a sway vibrating body making the water current power generating device as shown in FIG. 1 bends in response to a fluid force exerted on a circumference surface thereof by a water current, and sways in a bending state within a maximum deflection angle "α" from the direction of water current.

FIG. 2 is a state illustration schematically showing a vibration state in which a sway vibrating body making the water current power generating device as shown in FIG. 1 bends in response to a fluid force exerted on a circumference surface thereof by a water current, and sways in a bending state within a maximum deflection angle "α" (maximum variation) from the direction of water current.

Figure 3:
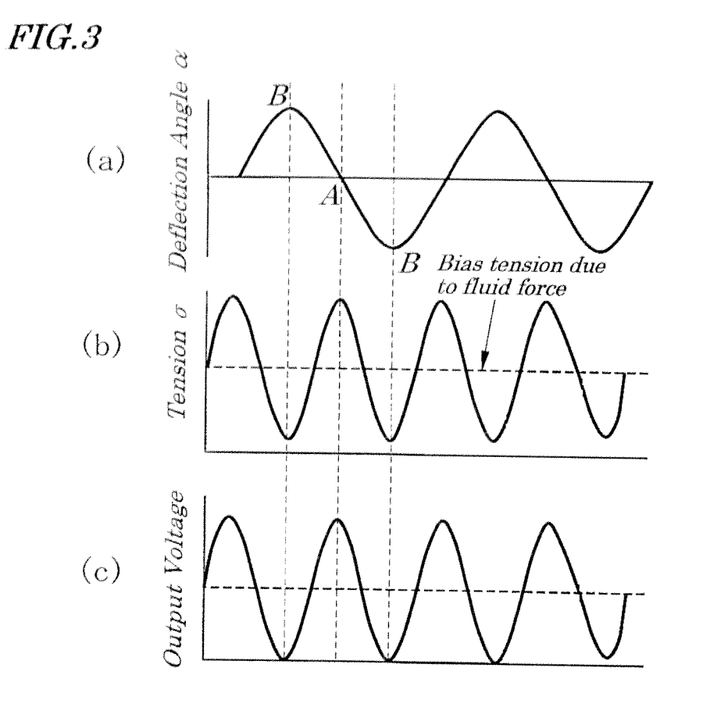
FIG. 3 is a group of wave form charts showing a vibration angular variation and a tension variation of the sway vibrating body making up the water current power generating device as shown in FIG. 1 and an output voltage from a tension generating unit making up the water current power generating device as shown in FIG. 1.

Also, FIG. 3 is a group of wave form charts showing a vibration angular variation and a tension variation of the sway vibrating body making up the water current power generating device as shown in FIG. 1 and an output voltage from a tension generating unit making up the water current power generating device as shown in FIG. 1.

The water current power generating device according to the present embodiment, as shown in FIG. 1, includes a sway vibrating body 1 (made up of a bowstring member) which bends in response to a fluid force exerted by a water current, and sways (vibrates in a mode of sway) in a bending state, and generates tension in response to a deflection angle (angle variation, or sway angle) from the current direction, and a piezoelectric type of tension power generating units 2, 2 for converting the tension transmitted from the sway vibrating body 1 into electric power.

First, mechanical configurations of the present embodiment are described.

The water current power generating device (hereinafter, may be referred to as sway vibration power generating device), as shown in FIG. 1, includes the sway vibrating body 1 made up of the bowstring member as mentioned above, a pair of disk-shaped tension power generating units 2, 2 placed at both end portions of the sway vibrating body 1, and a plurality of supporting columns 3, 3, . . . to define a water current region through which a water current passes.

Next, each part making up the sway vibration power generating device is described.

The sway vibrating body 1 as above-mentioned is made up long lengths of the bowstring member, bends in a downstream direction in response to a fluid force exerted on a circumference surface thereof by a water current, sways in a bending state, and generates tension in response to a deflection angle (angle variation, or sway angle) the direction of water current. In the present embodiment, the water current includes not only a tidal current and an ocean current, but also a stream of a river.

As materials for the above-mentioned bowstring member making up the sway vibrating body 1, a metal, a synthetic resin material, and a metal/resin composite all may be preferably used, as long as their materials have high tensile strength, flexibility, and is resistant to plastic deformation.

For example, an aramid fiber which suffers little secular changes in elongation may be used as a preferable synthetic resin material for the bowstring member. However, a preferable synthetic resin for the bowstring member is not limited to the above.

Moreover, a stainless steel and a titanium material which each are excellent in corrosion resistance, and a steel material such as a piano wire which suffers little change in elongation may be used as preferable metals for the bowstring member. However, preferable metals for the bowstring member are not limited to the above materials.

Here, a steel material, such as a piano wire, coated with a waterproofing resin or a like may be preferable used for the bowstring member, in order to ensure anti-corrosion properties on a circumference surface of the steel material. Also, an insert molded member combining the steel material and a chloroprene resin, a silicon rubber or a like, may be used for the bowstring member.

Moreover, when the sway vibration power generating device of the present embodiment is located not in a steady flow, but in a non-steady flow, tension is not always generated by the sway vibrating body 1, and therefore the sway vibrating body 1 (bowstring member) does not necessarily required high tensile strength.

A cross-sectional shape of the bowstring member making up the sway vibrating body 1 is not limited to a circle and may be an ellipse, a polygon, and a like. In addition, the bowstring member is not limited to a cord of solid wire and may be a twisted code, such as a rope, made of a plurality of element wires twisted together, since the bowstring member is not susceptible to adhesion of marine life.

A pair of a piezoelectric type of disk-shaped tension power generating units 2, 2 is placed at both end portions of the sway vibrating body 1 so that the tension power generating units 2, 2 are vertically opposed to each other, and configured to generate electric power called a piezoelectric effect, when tension is transmitted from the sway vibrating body 1 to the tension power generating units 2, 2.

Each tension power generating unit 2 includes an annular shape of piezoelectric element 5, on opposite faces of which a pair of electrodes 4a, 4b are formed, and a tension transmitting plate 6. The tension transmitting plate 6 is placed in a manner of a laminated structure on the electrode 4b formed on an outside face of the piezoelectric element 5 and transmitting tension generated in the sway vibrating body 1 to the piezoelectric element 5 therethrough.

In each tension power generating unit 2, a through hole 7a is formed in a center portion of the piezoelectric element 5, and a through holes 7b is formed in a center portion of the tension transmitting plate 6, so that the through holes 7a, 7b have a common axial center. A corresponding end portion of the sway vibrating body (bowstring member) 1 is inserted in the through holes 7a, 7b.

One end portion of the sway vibrating body (bowstring member) 1 is inserted in the through holes 7a, 7b of the piezoelectric element 5 and the tension transmitting plate 6 making up one tension power generating unit 2, and secured or engaged to an outer face of the tension transmitting plate 6 by using a fixture 8. Similarly, Another end portion of the sway vibrating body (bowstring member) 1 is inserted in the through holes 7a, 7b of the piezoelectric element 5 and the tension transmitting plate 6 making up another tension power generating unit 2 and secured or engaged to an outer face of the tension transmitting plate 6 by using a fixture 8.

Also, the piezoelectric element 5, a power outgoing line and a like making up each tension power generating unit 2 are waterproofed by resin coating, insert molding or a like (not shown) in order to prevent an electric short circuit.

Two tension power generating units 2, 2 (piezoelectric element 5, 5) are placed on opposite sides of a plurality of supporting columns 3, 3, . . . in a manner to be separated by the supporting columns 3, 3, . . . at a specified distance from each other away.

Thus, the sway vibrating body (bowstring member) 1 is placed between the opposed tension power generating units 2, 2 (piezoelectric elements 5, 5) in a manner to be able to sway in a bending and tensioned state, when put in a water current.

In the present embodiment, a relatively great diameter of the through hole 7a is formed in the piezoelectric element 5, in consideration of a sway movement of the sway vibrating body (bowstring member) 1. On the other hand, a relatively small diameter of the through hole 7b is formed in the tension transmitting plate 6, in consideration of securing or engaging of the sway vibrating body (bowstring member) 1 to the tension transmitting plate 6 by means of a fixture 8.

A plurality of supporting columns 3, 3 . . . is vertically arranged at equiangular intervals in and between opposed peripheral portions of disk-shaped tension power generating units 2, 2. Thus, a space which is defined by a pair of tension power generating units 2, 2 and a plurality of supporting column 3, 3 . . . serves as the above-mentioned water current region through which a water current, such as sea water current and fresh water current, passes in and out freely from any direction and any angle from a horizontal direction. Consequently, a force is constantly exerted on a circumference surface of the sway vibrating body 1 by a water current from an approximately normal direction to any portion of the circumference surface thereof.

The sway vibrating body 1, as shown in FIG. 2, bends in a downstream direction of water current in response to fluid forces F exerted on a circumference surface thereof by a water current, and sways from side to side within a maximum deflection angle "α" (maximum variation) from the direction of water current, similar to movements of a kite and a trolling depressor used in trolling fishery.

When the sway vibrating body 1 vibrates in a mode of sway, as shown in FIG. 3, a periodic tension "σ" of the sway vibrating body 1 generated corresponding to a period of the sway vibration acts on the piezoelectric element 5 as a fluctuating pressure P (FIG. 1) through the tension transmitting plate 6. As a result of this, the piezoelectric element 5 converts fluctuating pressure into electric power in response to a compressive stress.

Here, a period of self-sustained sway vibration is determined by a type of fluid, structural parameters of the sway vibrating body 1 (in detail, a cross section structure, length, density, and flexibility) and tension generated in the sway vibrating body 1. The tension occurs in the sway vibrating body 1 in response to fluid forces F exerted on a circumference surface thereof by a fluid current/flow (a water current/flow in the present embodiment).

Therefore, with configurations of the present embodiment, an appropriate current velocity range can be widely adjusted arbitrarily, within a range of elastic limit of the sway vibrating body 1, without requiring any complex mechanism by which tension for adjustment is applied to the sway vibrating body 1, and any mechanism for supporting the sway vibrating body 1 in a manner of elastic suspension.

As shown in FIG. 3, a periodic vibration angular variation ((a) in FIG. 3) of the sway vibrating body 1 generates a fluctuating tension (tension variation) "σ" in the sway vibrating body 1, on which only a bias tension ((b) in FIG. 3) generated in response to fluid forces F exerted by a water current/flow is superimposed. The fluctuating tension "σ" is transmitted from the sway vibrating body 1 to the piezoelectric elements 5, 5 through the tension transmitting plates 6, 6, and converted into an electric output ((c) in FIG. 3) by the piezoelectric elements 5, 5.

As mentioned above, with the present embodiment, the fluctuating tension (tension variation) "σ" due to a periodic vibration angular variation of the sway vibrating body 1 is applied to the piezoelectric elements 5, 5 as the fluctuating pressure P to be converted into an output voltage. Therefore, a level of the electric output does not depend upon the direction of water current, in other words, the vibrating direction of the sway vibrating body 1.

Next, circuit configurations of the present embodiment are described.

The sway vibration power generating device of the present embodiment, as shown in FIG. 1, includes an AC/DC (Direct Current/Alternating Current) separator 9 for passing only an AC component out of electric power output from the tension power generating units 2, 2, and an accumulator 10 for accumulating AC power output from the AC/DC separator 9. The electric power accumulated in accumulator 10 is supplied to an observation equipment (not shown) and alike.

The sway variation moving around from side to side is generated even in slow-moving water current, since the sway vibrating body 1 has low rigidity.

Moreover, tension "σ" generated at the both end portions of the sway vibrating body 1 varies with defection angles from the direction of water current during the sway motion of the sway vibrating body 1.

That is, once the sway vibrating body 1 has varied at a certain deflection angle from the direction of water current, the sway vibration thereof is continued as self-sustained vibration by kinetic energy generated based on inertia force arising from mass and the elastic force arising from tension.

It is not required to adjust compulsorily a resonance frequency of the sway vibrating body 1 to be within a specified frequency range, since the sway vibration power generating device does not utilize Karman vortices. For such a reason, the sway vibrating body 1 has a high degree of flexibility in selecting material and shape.

Therefore, despite the simple configuration of the sway vibrating body 1, the sway vibration power generating device can be effectively used in a variety of water areas of slow-moving water current to fast-moving water current.

Next, operations of the present embodiment are described.

As shown in FIG. 2, the sway vibrating body 1 bends in a downstream direction in response to a fluid force F exerted on a circumference surface thereof by a water current, sways in a bending state, and generates tension within a maximum deflection angle (maximum variation) from the direction of water current.

At a time of away motion, the sway vibrating body (bowstring member) 1, both end portions of which each are secured or engaged to the outer face of the tension transmitting plate 6 by using the fixture 8, bends in an arced shape and sways in a tense state in a downstream direction.

When the deflection angle (angle variation, or sway angle) of the sway vibrating body (bowstring member) 1 is "0" (FIG. 2 and (*a*) in FIG. 3), that is, when the sway vibrating body 1 is flowed the farthest from the common axial center of a pair of the through holes 7a, 7b in which the sway vibrating body 1 is inserted ("A" in FIG. 2), the tension "σ" generated in the sway vibrating body 1 reaches its maximum ((*b*) in FIG. 3).

The maximum tension generated in the sway vibrating body 1 acts as maximum pressure on the piezoelectric elements 5, 5 through the tension transmitting plate 6, 6, whereby output voltage from each tension power generating unit 2, 2 also reaches its maximum ((*c*) in FIG. 3).

Here, FIG. 2, shows exaggeratedly for emphasis a state in which the sway vibrating body 1 bends in the arc shape.

On the other hand, when the deflection angle of the sway vibrating body (bowstring member) 1 reaches its maximum "α" (FIG. 2 and (*a*) in FIG. 3), that is, when bending of the sway vibrating body 1 in an arced shape relaxed ("B" in FIG. 2), the tension "σ" generated in the sway vibrating body 1 reaches its minimum ((*b*) in FIG. 3).

The minimum tension generated in the sway vibrating body 1 acts as minimum pressure on the piezoelectric elements 5, 5 through the tension transmitting plate 6, 6, whereby output voltage from each tension power generating unit 2, 2 also reaches its minimum ((*c*) in FIG. 3).

tension "σ" generated at the both end portions of the sway vibrating body 1 varies with defection angles within a range of a defection angle zero to a maximum deflection angle "α" from the direction of water current during the sway motion of the sway vibrating body 1.

That is, once the sway vibrating body 1 has varied at a certain deflection angle from the direction of water current, the sway vibrating body 1 continuously sways from side to side in a manner twisted manner by kinetic energy generated based on inertia force arising from mass and the elastic force arising from tension, and thus, the sway vibration thereof is continued as self-sustained vibration.

The velocity and direction of tidal current generally vary with a lapse of time in a shallow sea area.

In such a case, the vibration period of the sway vibrating body 1 varies with velocity and direction of tidal current, whereas the fluctuating tension generated in the sway vibrating body 1 does not vary much in amplitude.

Therefore, according to the sway vibration power generating device of the first embodiment, ever stable electric power can be generated from water current power.

In addition, even when its plastic elongation of the sway vibrating body 1 occurs, while retaining its elasticity, by repetition of its sway motion, the vibration period of the sway vibrating body 1 and stress generated in the sway vibrating body 1 both vary very little. Even from this point, according to the sway vibration power generating device of the first embodiment, more stable electric power can be generated from water current power.

Second Exemplary Embodiment

Next, a second exemplary embodiment of the present invention is described.

A sway vibrating body (bowstring member) (not shown) of the second embodiment is different from a circular, ellipsoid, or polygonal cross-sectional shape of the sway vibrating body (bowstring member) 1 described in the first embodiment in that the sway vibrating body of the second embodiment is made up of a tension generating member having a form of tape, ribbon, spatula, or a like (hereinafter, may be simply referred to as a tape shape of tension generating member).

Components and the operations other than the different point mentioned above are basically the same as in the first embodiment and, therefore, descriptions are simply made or omitted in the second embodiment.

materials for the tension generating member used in the second embodiment may be basically the same as materials for the bowstring member used in the first embodiment According to the second embodiment, since the sway vibrating body is configured so that a periodic vibration easily occurs, greater amplitude of vibration and greater tension variation can be achieved, and therefore electric power can be generated from water current power with a higher degree of efficiency.

If the tape shape of tension generating member is formed to have further an arched cross-sectional shape, since still greater amplitude of vibration and still greater tension variation can be achieved, and therefore electric power can be generated from water current power with a still higher degree of efficiency.

In addition, the tape shape of tension generating member may be configured to have a widest part in the central portion, in order to achieve still greater tension.

The bowstring member described in the first embodiment is in particular suitable for uses in a tidal current or an ocean current that shifts direction at frequent intervals, whereas the tape shape of tension generating member used in the second embodiment is in particular suitable for uses in a tidal current or an ocean current that does not shift direction at frequent intervals.

Third Exemplary embodiment

Next, a third exemplary embodiment of the present invention is described.

A sway vibrating body (bowstring member) (not shown) of the third embodiment is different from the sway vibrating body (bowstring member) 1 described in the first embodiment in that the sway vibrating body (not shown) of the third embodiment is placed in a manner to have an arched shape in advance, even without acting of the fluid force in a water current.

Components and the operations other than the different point mentioned above, are basically the same as in the first embodiment and, therefore, descriptions are simply made or omitted in the second embodiment.

materials for the sway vibrating body used in the third embodiment may be basically the same as materials for the bowstring member used in the first embodiment The water current power generating device (not shown) according to the third embodiment includes an arched shape of a sway vibrating body which bends further in response to a fluid force exerted by a water current, and sways in a bending state, and generates tension in response to a deflection angle from the current direction, and a pair of tension power generating units for converting electromagnetically or piezoelectrically the tension transmitted from the sway vibrating body into electric power. The sway vibrating body is placed in a manner to have an arched shape in advance, even without acting of fluid force in a water current.

Even in the third exemplary embodiment, the same effect as obtained in the first embodiment can be realized.

In addition, since the arched shape of the sway vibrating body has a structure on which a fluid force can be effectively exerted even from a tidal current flowing an upward or downward slanting direction, the water current power generating device according to the third embodiment can be more preferably used in a water current area flowing an upward or downward slanting direction.

Also, the arched shape of the sway vibrating body as mentioned above may be made up of a tape shape of tension generating member, the same as described in the first embodiment.

In addition, the tape shape of tension generating member may be configured to have a widest part in the central portion, in order to achieve still greater tension.

While the invention has been particularly shown and described with reference to exemplary embodiments thereof, the invention is not limited to theses embodiments.

It will be understood by those of ordinary skill in the art that various changes in form and details may be made therein without departing from the sprit and scope of the present invention as defined by the claims.

For example, a mode of vibration is not limited to a thickness vibration and, if necessary, may be thickness-shear vibration, a flexural vibration or any other mode of vibration.

Also, in the above exemplary embodiment, the case is described where fluctuating pressure (compressive stress) is applied to a piezoelectric element. However, instead of the case, tensile stress may be applied.

Moreover, the above-mentioned piezoelectric element may be of either one of an integral configuration and a laminated configuration.

Moreover, the annular shape of piezoelectric element as mentioned above may be made up of a plurality of piezoelectric element segments each having a sector shape.

Also, while the sway vibration power generating device according to the present invention may be vertically located, is limited to this. The sway vibration power generating device also may be laterally located and inclined.

Moreover, in the above-mentioned embodiments, the case is described where a pair of tension power generating units is placed at the both end portions of the sway vibrating body. However, if necessary, a single tension power generating unit may be placed on any one side of both end portions of a sway vibrating body.

Moreover, a plurality of the water current power generating devices according to the present invention may be connected in parallel or in series, whereby increase in power output can achieved and power output variation with time can be reduced.

In the Karman vortex power generating device as mentioned above, if a plurality of column bodies is arranged adjacent to each other, the interference of the column bodies occurs and as a result the Karman vortex street is canceled or disturbed. On the other hand, in the sway variation power generating devices according to the present invention, even if a plurality of sway vibrating bodies is arranged adjacent to each other, the interference of the sway vibrating bodies does occurred unless the sway vibrating bodies do not contact each other. Therefore, the plurality of sway vibrating bodies can be arranged at a high density, without having an influence on sway motion.

Moreover, in the above exemplary embodiment, the case is described where the tension power generating unit is made up of a piezoelectric element. However, instead of the case, the tension power generating unit may be made up of a magnetic material mounted in at least one end portion of a sway vibrating body, and a coil surrounding the magnetic material, whereby tension variation is converted into displacement variation and electric power is electro-magnetically generated.

The water current power generating device according to the present invention can be used as a power supplying means for supplying electric power to an equipment for in a long-term marine environment observation, in particular, an environmental variation observation in the sea or on the seafloor due to development of marine resources, and an acoustic lighthouse having uses for position measurements and a like of an underwater navigating craft that must perform continuous operation.

In addition, the water current power generating device according to the present invention can be used as a power supplying means for supplying electric power to various kinds of sensors placed in small space areas, such a fluid pipe that is difficult to change battery and supply electric power.

What is claimed is:

1. A water current power generating device for generating an electric power from a water current power, the water current power generating device comprising:
   a sway vibrating body which bends in a bow shape in a downstream direction in response to a fluid force exerted on a circumference surface thereof by a water current, sways in a bending state, and generates tension in response to a deflection angle from a direction of said water current;

a pair of tension power generating units for converting said tension transmitted from said sway vibrating body into the electric power; and a plurality of supporting columns vertically arranged at specified angular intervals in and between opposing peripheral portions of said pair of tension power generating units.

2. The water current power generating device according to claim 1, wherein said sway vibrating body comprises a bow-string member.

3. The water current power generating device according to claim 1, wherein said pair of the tension power generating units comprises a pair of piezoelectric elements mounted on both end sides of said sway vibrating body, and wherein said tension generated in said sway vibrating body is configured to be transmitted to each of said piezoelectric elements through a corresponding tension transmitting plate, whereby a compressive stress or a bending stress is generated in said piezoelectric element.

4. The water current power generating device according to claim 1, wherein a space which is defined by said pair of the tension power generating units and the plurality of supporting columns serves as a water current region through which the water current passes.

5. The water current power generating device according to claim 1, wherein said plurality of supporting columns are vertically arranged at equiangular intervals in and between opposing peripheral portions of said pair of tension power generating units.

* * * * *